United States Patent
Goldsworthy

[15] 3,650,864

[45] Mar. 21, 1972

[54] METHOD FOR MAKING FILAMENT REINFORCED A-STAGE PROFILES

[72] Inventor: William B. Goldsworthy, Palos Verdes Estates, Calif.

[73] Assignee: Goldsworthy Engineering, Inc., Torrance, Calif.

[22] Filed: July 23, 1969

[21] Appl. No.: 844,022

Related U.S. Application Data

[63] Continuation-in-part of Ser. No. 674,820, Oct. 12, 1967, Pat. No. 3,576,705.

[52] U.S. Cl. ............................................................156/85
[51] Int. Cl. ......................................................B32b 31/04
[58] Field of Search ....................161/175; 156/251, 323, 85, 156/161, 165, 84, 86

[56] References Cited

UNITED STATES PATENTS

| | | | |
|---|---|---|---|
| 2,631,955 | 3/1953 | Muskat | 156/323 |
| 2,821,155 | 1/1958 | Seckel | 161/175 UX |
| 2,951,006 | 8/1960 | Rubenstein | 161/Rubenstein DIG. |
| 3,205,114 | 9/1965 | Gross | 156/251 |
| 3,234,064 | 2/1966 | Smith | 156/251 |
| 3,301,648 | 1/1967 | Sheldon | 156/85 |

Primary Examiner—Benjamin A. Borchelt
Assistant Examiner—Daniel A. Bent
Attorney—Robert J. Schaap, Joseph D. Kennedy and John D. Upham

[57] ABSTRACT

Fiberglass filament unwound from a series of spools is impregnated with a resin matrix and passed through a pair of rollers or sizing bushing for removing the excess resin and air therefrom. The resin impregnated fiberglass is then envelopely enclosed within a sheet of unidirectionally oriented plastic film, the latter being sealed along its upper longitudinal margin by means of an ultrasonic weld or heat weld. The film enclosed composite may then be heated to shrink the film. The temperature should be sufficiently low to have no curing effect on the resin leaving it in the uncured or so-called "A-stage." For some systems, it is desirable to advance the resin to a semicured or so-called "B-stage." The film enclosed composite may then be wound upon suitable reels and stored for further use.

20 Claims, 21 Drawing Figures

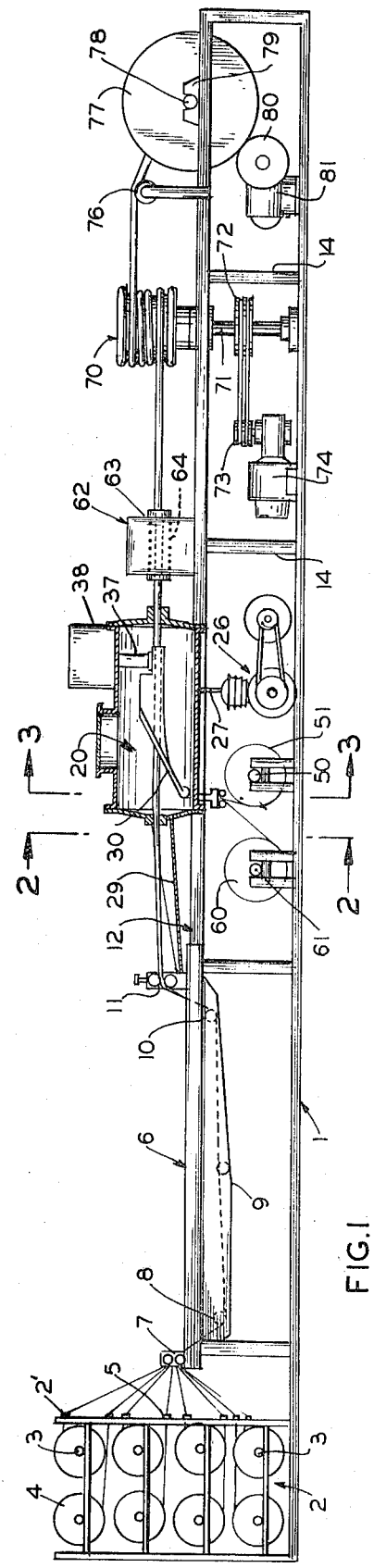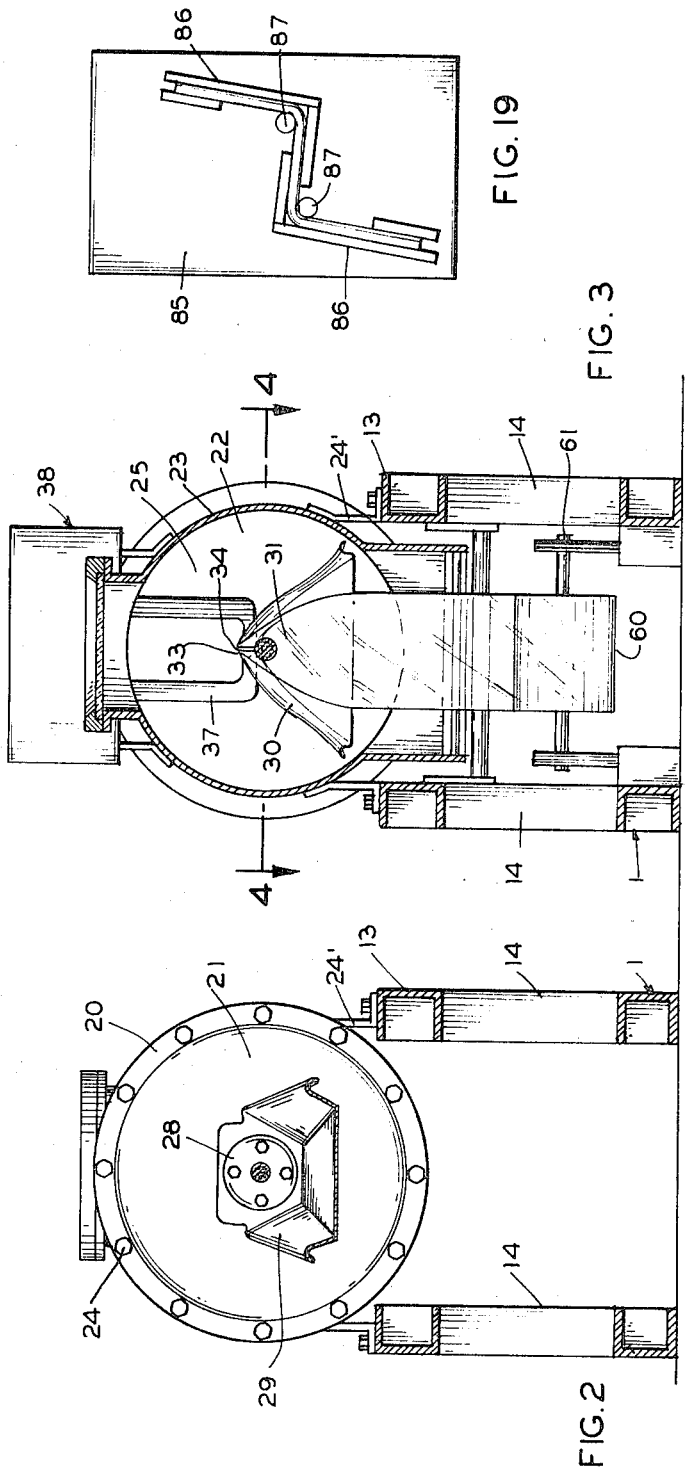

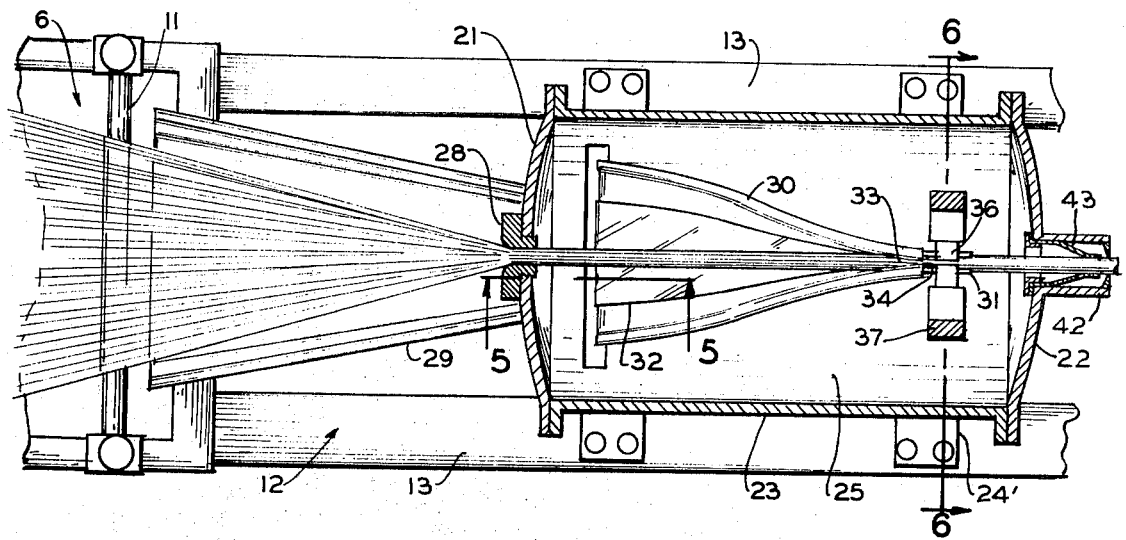
FIG. 4
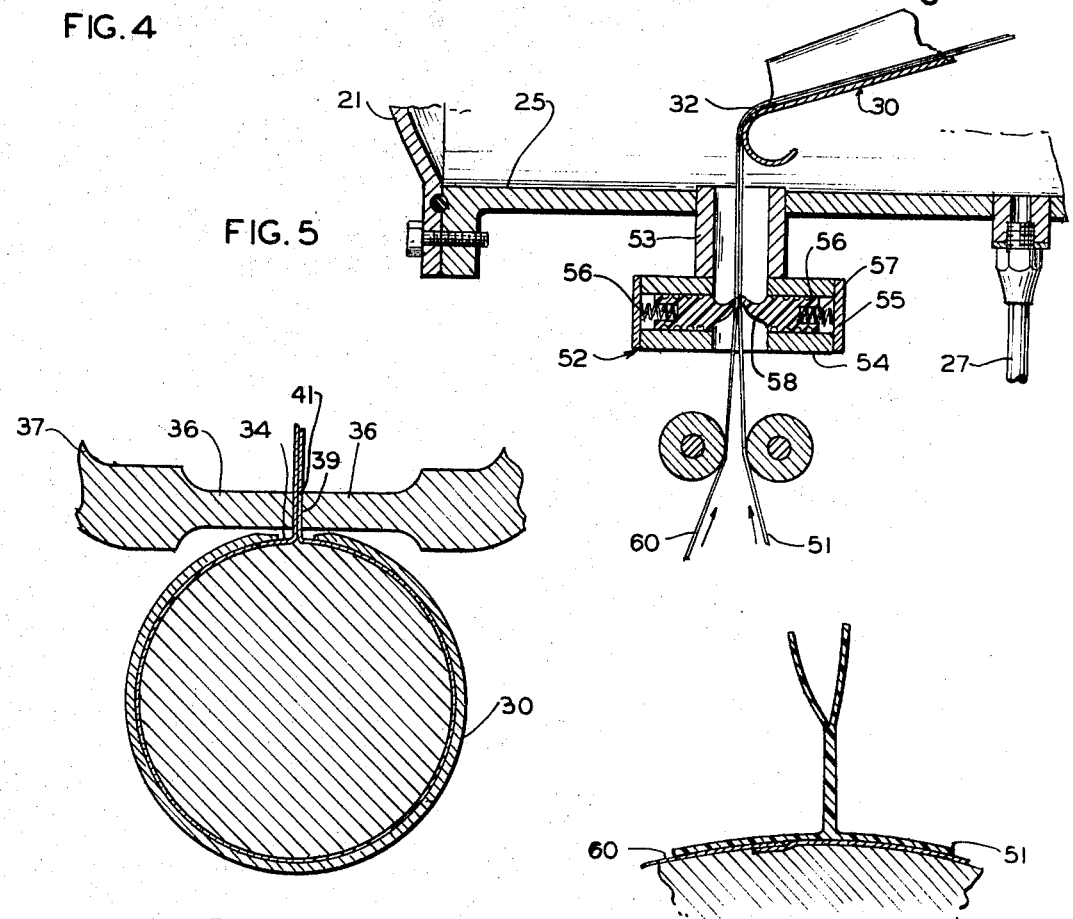
FIG. 5
FIG. 6
FIG. 7

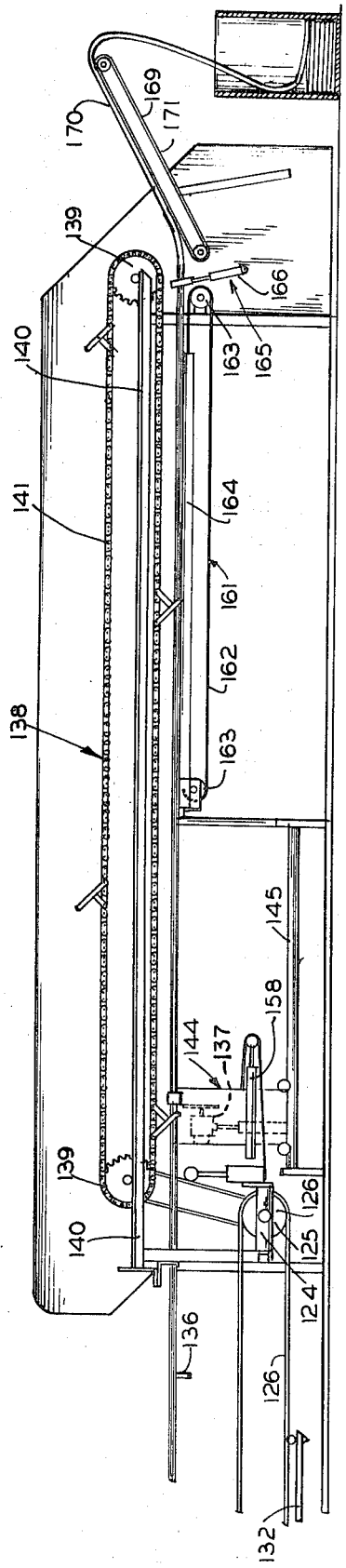
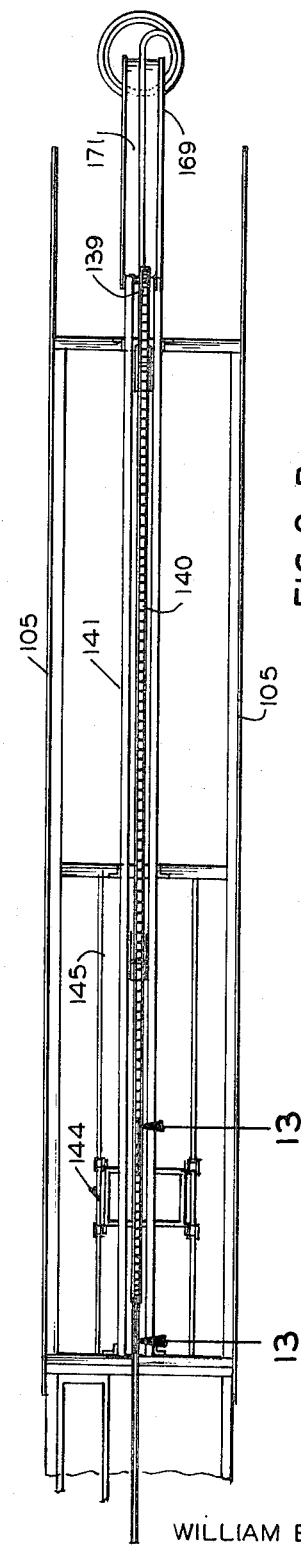

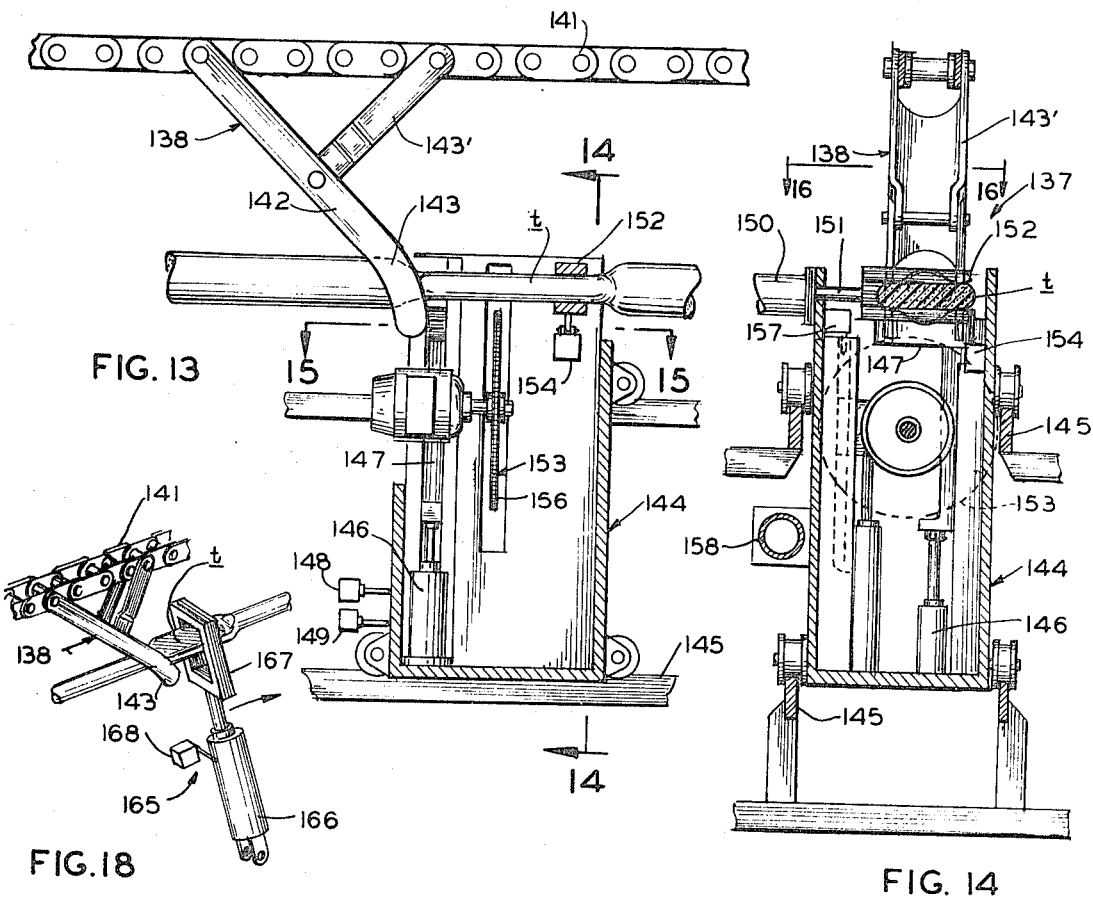

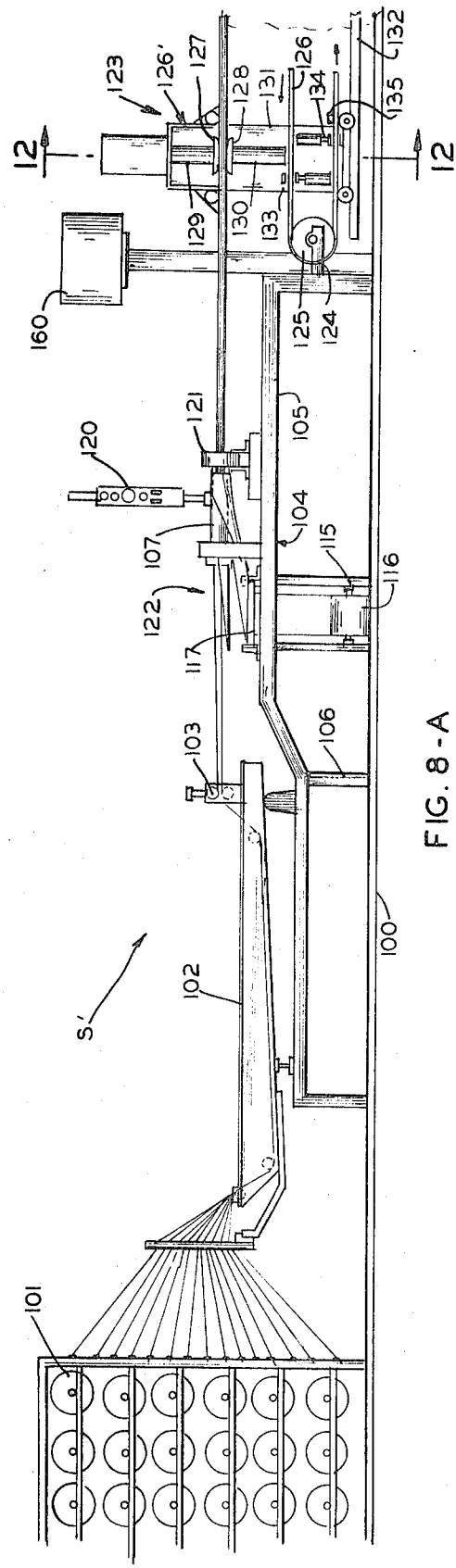
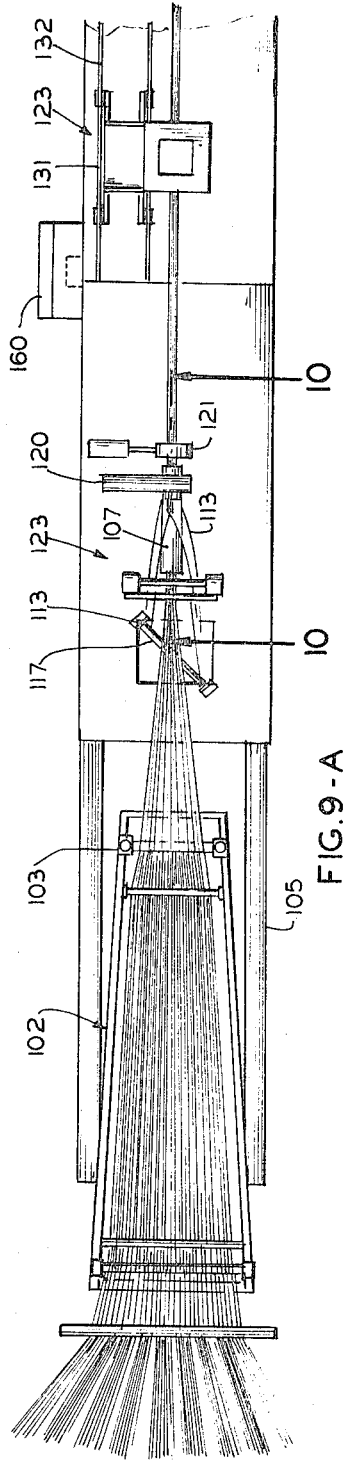
FIG. 8-A
FIG. 9-A

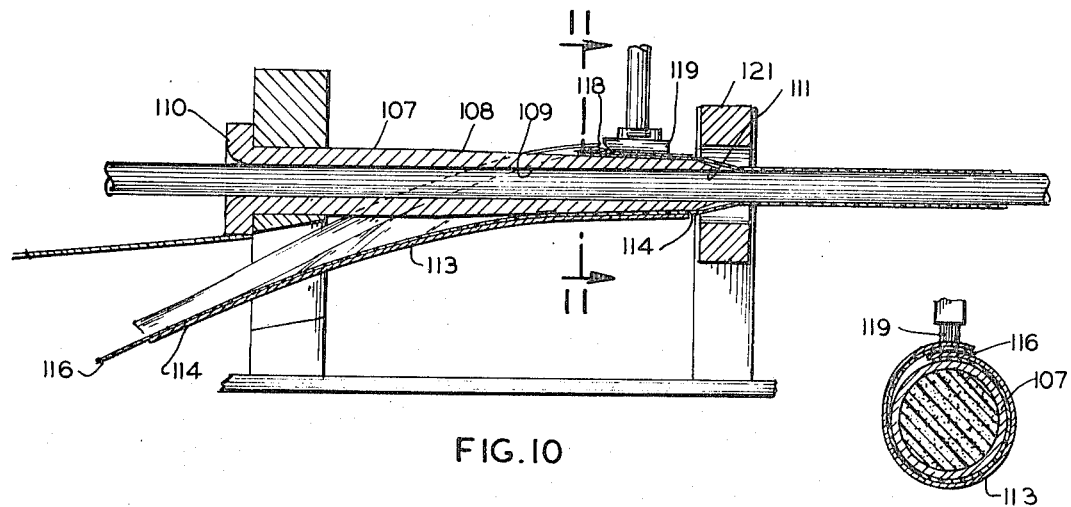
FIG. 10
FIG. 11
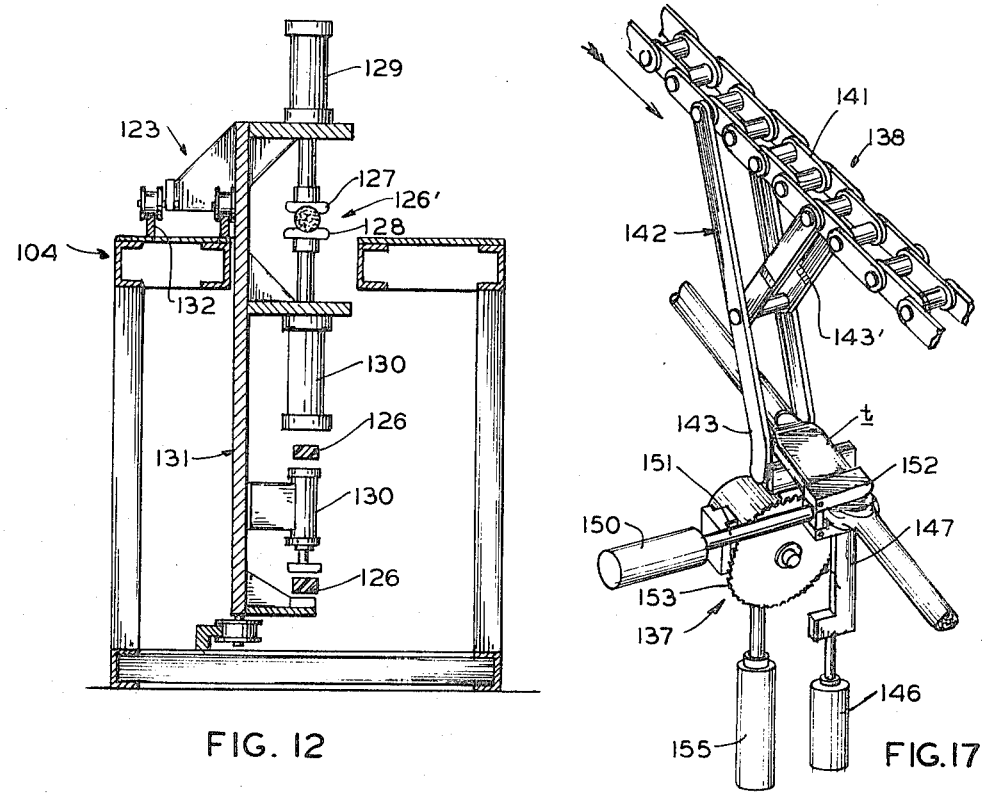
FIG. 12
FIG. 17
INVENTOR
WILLIAM B. GOLDSWORTH
BY Robert J. Schaap
ATTORNEY

METHOD FOR MAKING FILAMENT REINFORCED A-STAGE PROFILES

This application is a continuation-in-part of my copending application Ser. No. 674,820, filed Oct. 12, 1967, now U.S. Pat. No. 3,576,705.

The present invention relates in general to certain new and useful improvements to filament reinforced profiles, and more particularly to a method and apparatus for making A-stage filament reinforced profiles.

Due to the various inherent disadvantages of structural metals, such as aluminum and steel, reinforced plastics and fiberglass structural shapes have found widespread use. The structural metals are inherently disadvantageous as a material of construction due to the expensive apparatus necessary to form these materials to a desired shape and also because such materials are readily subjected to corrosive effects. Furthermore, such materials are in constant need of painting and other protective coatings. In addition, it is often difficult and expensive to imprint a desired design on the exterior surface of metal structural profiles.

There are a number of commercially available devices, such as the device described in U.S. Letters Pat. No. 2,871,911 for producing filament reinforced profiles on a continuous basis. However, in all of the commercially available devices, the profiles are cured into a rigid form during the actual production thereof. Once the matrix system in a filament reinforced profile has been cured, the profile is rendered substantially incapable of being formed or bent to a desired shape. As a result of this problem, filament reinforced profiles have not been used in many applications where their employment could present great advantage over the structural metal profiles.

It is, therefore, the primary object of the present invention to provide a method and apparatus for producing A-stage filament reinforced profiles.

It is another object of the present invention to produce an apparatus and method of the type stated for making rod-shaped structural elements on a continuous basis and rendering the same inactive for ultimate curing to a rigid state.

It is an additional object of the present invention to provide an apparatus and method of the type stated which is capable of producing A-stage filament reinforced rodlike profiles on a mass-production basis and at a relatively low unit cost.

It is another salient object of the present invention to provide a method and apparatus of the type stated for rendering a desired external appearance and design to the exterior surface of a filament reinforced profile.

It is also an object of the present invention to provide a method and apparatus of the type stated for producing A-stage filament reinforced profiles enclosed within an outer cover and which is capable of being stored for curing and use at a later date.

With the above and other objects in view, my invention resides in the novel features of form, construction, combination and arrangement of parts presently described and pointed out.

In the accompanying drawings (six sheets):

FIG. 1 is a side elevational view of an apparatus for producing filament reinforced profiles, which apparatus is constructed in accordance with and embodies the present invention;

FIGS. 2 and 3 are vertical sectional views taken along lines 2—2 and 3—3 respectively of FIG. 1;

FIG. 4 is a horizontal sectional view taken along line 4—4 of FIG. 3;

FIG. 5 is a vertical sectional view taken along line 5—5 of FIG. 4 and showing an air lock forming part of the present invention;

FIG. 6 is a vertical sectional view taken along line 6—6 of FIG. 4 and showing the seam welding of the oriented film in the process of the present invention;

FIG. 7 is a schematic view showing the type of seal achieved through the process of the present invention;

FIGS. 8a and 8b are composite side elevational views of a modified form of apparatus for producing filament reinforced profiles;

FIGS. 9a and 9b are composite top plan views of the apparatus of FIGS. 8a and 8b;

FIG. 10 is a fragmentary vertical sectional view taken along line 10—10 of FIG. 9a;

FIG. 11 is a fragmentary vertical sectional view taken along line 11—11 of FIG. 10;

FIG. 12 is a vertical sectional view taken along line 12—12 of FIG. 8a;

FIG. 13 is a fragmentary vertical sectional view taken along line 13—13 of FIG. 9b;

FIG. 14 is a fragmentary vertical sectional view taken along line 14—14 of FIG. 13;

FIG. 15 is a fragmentary horizontal sectional view taken along line 15—15 of FIG. 13;

FIG. 16 is a fragmentary horizontal sectional view taken along line 16—16 of FIG. 14;

FIG. 17 is a perspective view showing a portion of the apparatus embodied in FIGS. 13–16 for forming discrete sections of the filament reinforced profile produced;

FIG. 18 is a perspective view showing a portion of the apparatus for moving the filament reinforced profile thus produced; and FIG. 19 is a schematic view illustrating die blocks for forming the profile of the present invention.

GENERAL DESCRIPTION

The present invention relates to a method and an apparatus for producing rod-shaped filament reinforced profiles on a continuous basis in an A-stage or B-stage condition where the profile may be continuously wrapped on a spool and stored for further use. The apparatus generally comprises a creel having a plurality of filament spools. Filament is unwound from the spools and passed through a resin tank for impregnation of a resin matrix in the filament. The resin impregnated filament is then passed through a sealing ring and into a vacuum tank.

A continuous sheet of unidirectionally oriented plastic film is also passed into the vacuum tank and disposed within an enveloping tube. The tube which is initially flat, curves into a complete circumferential form. The resin impregnated filament is disposed upon the film and enclosed within the film as it passes through the tube. The film and the filament enclosed therein is continually pulled through the vacuum tank by means of a capstan located externally of the vacuum tank. As the plastic film is completely wrapped around the filament, the film is sealed by means of an ultrasonic weld, which does not affect the uncured matrix impregnated in the fiberglass filament, thereby forming an uncured rod-shaped profile.

As the film enclosed fiberglass is passed through the tube, the air and excess resin is forced rearwardly. The profile is then passed into a tunnel oven or hot water bath for shrinking the plastic film. The temperature in the shrinking operation is sufficiently low so that no curing effect takes place in the resin leaving the same in the uncured or so-called "A-stage".

In another embodiment of the apparatus and method of the present invention, the resin impregnated filament is passed into a steel tube which is sized to accommodate the number of strands of filament being passed therethrough. The unidirectionally oriented plastic film is then wrapped about the exterior of the steel tube and envelopes the strands as they pass out of the other end of the tube. The plastic film is also sealed along its longitudinal margins and shrunk in a suitable shrinking oven. The A-stage profile thus formed is sequentially cured in the form of a flat platelike portion at preselected distances on the downstream side of the steel tube. A fork-like member forming part of a conveyor system engages the profile at these platelike portions and moves the stock through the apparatus.

After the profile has been formed, it can then be wound upon any conventional reel or spool for storing. For certain filament resin systems it is possible to cause the resin matrix to cure to a semi-cured stage or so-called "B-stage", where the resin impregnated filament is partially cured or gelled.

When it is desired to use the profile, the profile can then be bent or shaped into any desired form and cured in that form for ultimate use.

DETAILED DESCRIPTION

Referring now in more detail and by reference characters to the drawings which illustrate practical embodiments of the present invention, FIG. 1 designates an apparatus S for producing rod-shaped A-stage filament reinforced profile. The apparatus S generally comprises a base plate 1 which is provided with a creel 2, the latter having a plurality of upstanding racks 2'. Upwardly and outwardly extending pins 3 are mounted on each of the racks for retaining conventional spools of filament or roving 4. The strands of filament or so-called "rovings" are passed through eyelets 5 which are mounted on the upstanding racks 2'. In many operations, it is desirable to separate the creel 2 from the remainder of the apparatus S in order to provide for convenient interchangeability of creels.

The strands of filament are then passed into a resin tank 6 which is also mounted on the base plate 1. The tank is provided with a roller 7 at its left transverse end, reference being made to FIG. 1. The strands are then passed under a holddown roller 8 located near the bottom wall 9 of the tank 6. The roving is next passed under a second holddown roller 10 located at the right transverse end of the tank, reference being made to FIG. 1 and then passed through a pair of squeeze-out rollers 11, which are mounted on the upper end of the tank 6, substantially in the manner as illustrated in FIG. 1. It can be seen that the rollers 11 serve as a type of ringer for removing the excess resin and air from the filament strands. The tank is preferably filled with a heat curable liquid resin which is capable of being cured into a rigid state upon heating.

Any continuous natural or synthetic filament capable of being bent to conform to a desired shape can be employed in the present invention. The most preferred filament employed in the present invention is that made of glass. However, it should be recognized that boron filaments, filaments from lithium and other grown-whisker crystals can be employed. In addition, metal wire may be interspersed with the glass filaments in the event that it is desired to add some type of metallic body to the fiberglass reinforced structure which is produced, such as for electrical conductivity. Furthermore, quartz filaments may also be employed.

Any material which is normally a liquid or which is capable at some stage of the process of being liquefied and softened for a period of time may be employed as the resin binder or so-called "matrix". The matrix should be sufficient to flow into the filament and fill the interstices between adjacent filaments and layers thereof before heating or polymerization would render the same rigid. Furthermore, the matrix should possess the ability to adhere to the reinforcement. Some examples of the suitable binders or matrix which can be employed in the present invention are various thermosetting resins such as polyesters, many of the phenolics and epoxys, etc. can be used. Generally, the thermosetting resins should be capable of being fused into an insoluble, non-heat softening mass upon application of heat or similar method of triggering the catalytic system. Other binders or matrices are hard waxes, eutectic ceramics, eutectic metals, synthetic rubbers, etc.

Rigidly mounted on the base plate 1 to the right of the resin tank 6 is a supporting structure 12 which generally comprises a pair of transversely spaced longitudinal support rails 13, which are supported by upwardly extending struts 14, in the manner as illustrated in FIGS. 1–3. The rails 13 and struts 14 may be in the form of any standard U-shaped structural section.

The strands of filament are next passed into a vacuum housing 20 having a left end wall 21, a right end wall 22, and an annular side wall 23. The end walls 21, 22 are removably secured by bolts 24. Furthermore, the housing 20 is secured to the longitudinal support rails 13 by means of brackets 24'. The housing 20 forms an internal vacuum chamber 25 and is connected to a suitable vacuum pump 26 and related system through a pipe 27. The left end wall 21 is suitably apertured and provided with a bushing or sealing ring 28 preferably formed of neoprene rubber, for receiving the filament strands into the chamber 25. The bushing 28 is sized only to accommodate the strands of roving so that it can achieve a seal in order to prevent disturbance of vacuum conditions in the vacuum chamber 25. A tray 29 is connected to the left end wall 21 and terminates at the tank 6 for conducting into the tank any small amounts of entrained excess resin that may be removed from the filament bundle at the bushing 28.

Suitably mounted within the housing 20 by means of any conventional supporting structure is a wrapping tube 30 of so-called "forming chute", which is more fully illustrated in FIGS. 3 and 4. The wrapping tube 30 is curved about its longitudinal axis and is initially formed from a flat metal sheet. The radius of curvature decreases progressively along the longitudinal axis of the tube 30 to form an exit aperture 31. It can be seen that the left-hand end of the tube 30, reference being made to FIG. 4 is only slightly curved and in essence, forms a receiving tray 32, which is also curved downwardly. As the distance along the tube 30 progresses to the right-hand end thereof, reference being made to FIG. 4, the longitudinal margins are curved upwardly and inwardly so that the tube would form a surface of revolution, the circumference and radius of which would decrease with progression along the longitudinal axis thereof. The two longitudinal margins of the tube 30 are curved upwardly until they are only separated by a small distance and are then struck upwardly in the form of a pair of spaced, opposed upwardly extending flanges 33 separated by a longitudinal slot 34. It can be seen that at the point where the tube is formed with the upwardly extending flanges 33, the diameter of the tube is approximately the same diameter as the strands of filament, which is passed thereinto. The tube 30 may also be formed by casting the same from sheet metal or can be made of plastic in any conventional forming operation.

The upper half of the right-hand end of the tube 30 is cut away for accommodation of a pair of metallic plates 36 forming part of a yoke 37 which is in turn operatively associated with an ultrasonic sealing device 38. The ultrasonic device 38 is conventional in its construction and is, therefore, neither further illustrated nor described in detail herein. However, the plates 36 have substantially the same size and shape as the portion of the flanges 33 of the tube 30 which was removed and are provided with opposed flat walls 39 which are separated by a longitudinal gap 41.

The right end wall 22 is provided with a discharge tube 42 having an annular teflon seal 43 for accommodation of the filament strands as they are pulled through the vacuum housing 20.

Mounted on the base plate 1 beneath the housing 20 is a spindle 50 for rotatably retaining a spool of unidirectionally oriented plastic film or sheet 51. The film 51 is admitted to the vacuum chamber 25 through a vacuum sealing gate 52 which is mounted on the underside of the housing and which is more fully illustrated in FIG. 5. The vacuum sealing gate 52 generally comprises a cylindrical tube 53 which is mounted on the underside of the housing 20 and which in turn communicates with a horizontally disposed gate tube 54, which is in turn provided with end walls 55. The tube 54 is provided with a longitudinal central bore 56 for accommodating compression springs 57 which abut against each of the end walls 55. The compression springs 57 are designed to bias teflon seals 58 into engagement with each other in the manner as illustrated in FIG. 5. The teflon seals 58 are shiftably disposed within the bore 56 and are biased into engagement with each other by means of the springs 57. Thus, it can be seen that the seals 58 will bear against the flat planar surfaces of the plastic sheet 51 as it passes into the chamber 25 and thereby provide a vacuum seal.

The plastic sheet is disposed upon the left-hand end of the tube 30 in the manner as illustrated in FIG. 1, and is passed through the tube 30. The resin impregnated strands of filament are disposed upon the upper surface of the plastic sheet and are pulled through the tube 30 simultaneously therewith. It can be seen that as the plastic sheet is pulled through the tube 30, the longitudinal margins thereof will curve in conformance with the cross-sectional shape of the tube. Furthermore, the longitudinal margins of the plastic sheet will extend into the longitudinal slot 34 between the pair of upstanding flanges 33. Actuation of the ultrasonic sealing unit 38 will seal the upper longitudinal margins of the plastic sheet around the strands of resin, thereby enclosing the resin impregnated filament. However, the ultrasonic sealing of the plastic film will not in any way affect the heat curable resin. In addition, it can be seen that the tube 30 at its right-hand end is formed with substantially the same cross-sectional shape and size as the wrapped filament. By means of this construction, the air that may be entrained between the filament strand and the film will be forced rearwardly as the wrapped strands are pulled through the discharge end 31 of the tube 30. While it is not absolutely necessary to employ a vacuum housing 20 for wrapping the film about the filament, this type of structure is desirable. It is also possible to employ form rolls in place of the forming chute illustrated and described for wrapping the film about the filament composite. In many cases rubber content form rolls have been found to be effective to remove any possibility of wrinkles in the film.

Some of the plastic films which are capable of being used in connection with the present invention are some of the vinyl copolymers such as vinylidene chloride. The important criterion is that the film must be uniaxially oriented so that it will shrink only in one direction. Other films which may be employed in connection with the present invention are various thermoplastic materials such as styrene, styrene-butadiene copolymers, Mylar films, polyethylene, some of the polyvinyl alcohols, etc.

The design or surface finish of the film is suitably transferred to the composite of resin-impregnated filament, and when the film is removed after curing of the composite the design on the film is transferred to the exterior surface of the composite. Embossing on the surface of the film can also be imparted to the surface of the composite.

The catalyst which is employed in the resin depends upon the type of operation which is used. It is possible to obtain a translucent or transparent profile and therefore an ultraviolet catalyst such as benzoin may be employed. This is a preferred catalyst since it gives a minimum exothermic reaction and a minimum cure shrink. Catalysts such as benzyl peroxide would be used in cases of heat curing. It is also possible to add a dye, a pigment or filler material to the resin so that the latter is impregnated in the filament as it is passed into the vacuum housing 20. For example, it may be desirable to impregnate the plastic material with a gold glitter type of material and this material would be added to the resin tank 6.

It is also possible to employ a second plastic film 60, which is mounted on a spindle 61, the latter in turn being secured to the base plate 1 in the manner as illustrated in FIG. 1. The plastic film 60 can serve as decorative type of coating and can also be wound upon the resin impregnated fiberglass. The film 60 is also passed into the vacuum chamber 25 through the vacuum sealing gate 52. In the event that it was desired to use the decorative film 60 along with the film 51, the decorative film would probably be applied to the resin impregnated fiberglass with the heat shrinkable film 51 disposed therearound. In essence, the heat shrinkable film 51 would provide the outer cover. If the dual type of film were employed, in use, the decorative film 60 would probably remain upon the exterior surface of the fiberglass profile.

The envelopely covered filament is next passed into a shrinking zone 62 which includes an outer housing 63 mounted on the longitudinal support rails 13 in the manner as illustrated in FIG. 1. The housing 63 is provided with a conventional heating element 64 for heating the film 51 to the desired temperature, thereby causing the same to shrink around the outer surface of the resin impregnated filament. The temperature of the heating element 64 is carefully controlled so that only enough heat is provided to shrink the plastic film 51, but not to actuate the catalyst in the resin matrix. In general, the shrinking zone is kept at a temperature of about 140° to 250° F. The resin matrix will not be energized and the profile thus formed will still be in the A-stage. Shrinking of the film is a time-temperature function and therefore shrinking zone temperatures are governed by the speed of operation. It can be seen that the plastic film 51 prevents any of the catalyst from evaporating or creating any oxidation thereof since the matrix does not come into contact with air. It is possible to heat the resin impregnated fiberglass in the shrinking zone 62 to a temperature where the resin matrix is partially gelled or energized to the so-called "B-stage". In addition, a second heating zone could be employed if it is desired to cure the resin to a B-stage.

The film is pulled outwardly through the vacuum housing 20 and the shrinking zone 62 by means of a capstan which serves as a pulling unit 70. The capstan is mounted upon a drive rod 71, the latter in turn being rotatably mounted on the base plate 1 in the manner as illustrated in FIG. 1. The drive shaft 71 is provided with a pulley 72, which coacts with a matching drive pulley 73 on a conventional electric motor 74. A drive belt 75 is trained around the pulleys 72,73. A number of turns of the profile is wrapped around the capstan 70 and then passed over a guide roller 76 for winding upon a spool 77. However, it should be recognized that other forms of pulling units could be employed, such as a pair of driven wheels, a pair of engageable movable tractor belts or reciprocating gripper blocks. In many cases under/over single pass drums have been found to be effective for substitution of the capstan.

By further reference to FIG. 1, it can be seen that the spool 77 is mounted upon a conventional spindle 78, the latter in turn being held by transversely spaced guides 79 mounted upon each of the support rails 13. The spool 77 is, in turn, driven by a drive wheel 80, the latter being energized by a conventional electric motor 81. Thus, it can be seen that the pulling unit 70 is designed only to pull the profile form through the vacuum housing 20 and shrinking zone 62 at a desired rate of speed. Furthermore, the profile form is wound upon the spool 77 at this desired rate of speed. After the profile has been wound upon the spool 77, it can be stored for long periods of time until further use. In general, it is desirable to store the profile form at a temperature which does not exceed 40° F.

It is possible to provide a modified form of apparatus S' for producing rod-shaped A-stage filament profiles more fully illustrated in FIGS. 8a–18. The apparatus S' generally comprises a base plate 100 with a creel 101 mounted thereon, the creel 101 being substantially identical to the creel 2 and supplying strands of filament.

The strands of filament from the creel 101 are then passed into a resin tank 102 which is also mounted on the base plate 1 and is substantially identical to the tank 6. The roving is then passed through a pair of squeeze-out rollers 103, which are mounted on the upper end of the tank 102, substantially in the manner as illustrated in FIG. 8a. Any continuous natural or synthetic filament capable of being used in the apparatus S can also be employed in the apparatus S'. Any resin binder or so-called "matrix" used in the apparatus S can also be used in the apparatus S'.

Rigidly mounted on the base plate 100 to the right of the resin tank 102 is a supporting structure 104 which generally comprises a pair of transversely spaced longitudinal support rails 105, which are supported by upwardly extending struts 106, in the manner illustrated in FIGS. 8a and 8b. The rails 105 and struts 106 may be in the form of any standard structural section.

The strands of filament are next passed into a gathering tube 107 and having an exterior annular wall 108 and an internal bore 109. The tube 107 is preferably formed of steel and is mounted on the structure 104. The gathering tube 107 also has an outwardly flaring annular flange 110 at its left end and an exit aperture 111 at its right end.

Suitably mounted on the structure 104 is a wrapping tube 113 or so-called "forming chute", which is more fully illustrated in FIGS. 10 and 11. The wrapping tube 113 is disposed about the gathering tube 107 in the manner illustrated in FIG. 10 and is initially formed from a flat metal sheet and curved about its longitudinal axis. The radius of curvature decreases progressively along the longitudinal axis of the wrapping tube 113 to form an exit aperture 114 slightly to the rear of the exit aperture 111 on the gathering tube 107. It can be seen that the left-hand end of the tube 113, reference being made to FIGS. 8a and 10, is only slightly curved and in essence, forms a receiving tray 114, which is also curved downwardly. As the distance along the tube 113 progresses to the right-hand end thereof, the longitudinal margins are curved upwardly and inwardly so that the tube would form a surface of revolution, the circumference and radius of which would decrease with progression along the longitudinal axis thereof. The two longitudinal margins of the tube 113 are curved upwardly, overlapped and tacked in place. It can be seen that at the point where the longitudinal margins of the tube 113 are tack welded together, the diameter of the tube 113 is only slightly larger than the diameter of the gathering tube 107. The tube 113 may also be formed by forming the same from sheet metal or can be made of plastic in any conventional forming operation.

Mounted on the base plate 100 is a spindle 115 for rotatably retaining a spool of unidirectionally oriented plastic film or sheet 116. The film 116 is trained around a plurality of guide rollers 117 and is disposed in the forming tube 113 so that it is wrapped about the gathering tube 107 in the manner illustrated in FIG. 10. The sheet of plastic 116 is then pulled along through the exit aperture 114 and over the strands of filament as they exit through the aperture 111 of the gathering tube 107. The forming chute 113 is provided with an aperture 118 at its upper end for accommodating one electrode or the so-called "horn" 119 of an ultrasonic curing unit 120. The gathering tube 107, which is metallic and constructed of a fairly rigid steel serves as the "anvil" or other electrode for the ultrasonic curing unit 120. Thus, as the plastic sheet 116 is pulled along through the forming chute 113, it is continually sealed by the ultrasonic curing unit 120 along its upper margins. Furthermore, by reference to FIG. 11, it can be seen that the longitudinal margins of the plastic film 116 are overlapped and sealed in this manner.

After the plastic film 116 has been disposed about the filaments pulled through the gathering tube 107, the assembly is then immediately passed into a film shrinking heater 121 which is energized to provide just a sufficient amount of heat in order to shrink the plastic film about the resin impregnated fibers. The heat generated by the film shrinking heater 121 is not sufficient to create any curing effect upon the resin entrained in the fiber mass. Furthermore, it can be observed that as the plastic film is sequentially shrunk about the resin impregnated fibers passing through the heater 121, any air which may have accumulated in the space between the film and the resin impregnated fiber mass is forced rearwardly, so that no air will be entrained in the composite enclosed within the plastic film 116. The plastic films which are capable of being used in connection with the apparatus S' are the same plastic films which are useful in the apparatus S. In like manner, the design or surface finish of the film 116 can be suitably transferred to the composite of resin impregnated filament, and when the film is removed after curing of the composite, the design on the film is transferred to the exterior surface of the composite. Embossment of the surface of the film can also be imparted to the surface of the composite in like manner.

Thus, it can be seen that the assembly of the gathering tube 107, the forming tube 113, and the means which supply the plastic film 116, along with the heating of the film shrinking heater 121 in combination comprise a forming unit 122. Also mounted on the base plate 1 in abutting engagement with the forming unit 122 is a curing unit 123. The curing unit 123 also employs the main supporting structure 104 and mounted on a longitudinal support bar 124 are a pair of pulleys 125 with a belt 126 trained therearound, the latter being driven in a manner hereinafter described.

Also mounted on the supporting structure 104 is a spot curing heater 126 having a pair of shiftable plates 127,128 in the manner as illustrated in FIG. 12. The curing plate 127 is secured to a pneumatic cylinder 129 and capable of being shifted in the downwardly direction in timed relation to the upper shifting movement of the curing plate 128 which is in turn fastened to a pneumatic cylinder 130.

The spot curing unit 126 is in turn fastened to a longitudinally shiftable carriage 131 which is movable along a trackway 132 and includes an upper pneumatically operated clamp 133 and a lower pneumatically operated clamp 134. Thus, upon a proper signal, the pneumatic clamp 134 will be energized and engage the lower portion of the continuous belt 126, causing movement to the right of the entire carriage 131. A limit switch 135 will cause energization of the two pneumatic cylinders 129,130 causing the heating plates 127,128 to shift together. Furthermore, the movement of the carriage 131 is timed to coincide with the movement of the stock passing through the apparatus S'.

As the plates 127,128 engage the stock, they cure the resin therein and compress the stock to form a relatively flat stub $t$, which is completely cured so that the resin is then advanced to the C or "cured" stage. As the carriage 131 reaches its forward limit of travel, it will then engage a pair of limit switches 136 which cause the pneumatic cylinders 129,130 to withdraw the two heating plates 127,128 and to deactuate the pneumatic clamp 134. Furthermore, the clamp 133 will become energized and will engage the upper portion of the continuous belt 126 thereby shifting the entire carriage 131 to its initial position as illustrated in FIG. 8a and FIG. 8b. Furthermore, it should be observed that the stock which has been segmentally cured is continually moving through the apparatus S'.

Also mounted on the base plate 100 in abutting engagement to the curing unit 123 is a cutting unit 137 and secured to the upper end of the cutting unit 137 is a stock conveyor or driving unit 138. The stock conveyor unit similarly comprises a pair of longitudinally spaced pulleys 139 mounted on a longitudinally extending support bar 140 and have trained around the pulleys 139 a continuous chain 141. Furthermore, it can be seen that the stock conveyor unit 138 also drives the continuous belt 126. Mounted on the continuous chain 141 are a plurality of spaced outwardly extending hooks or so-called claws 142 which have a pair of fingers 143 at their outer ends for engaging the stub $t$ on the stock in the manner as illustrated in FIGS. 13 and 17. Thus, it can be seen that as each of the claws 142 swings around the left pulley 139, it is timed to engage the stub $t$ on the stock in the manner as illustrated for pulling the stock through the apparatus S'. It is also to be noted that each the claws 142 is reinforced by means of a link 143'.

The cutting unit 137 also comprises a carriage 144 movable along a trackway 145, in the manner as illustrated in FIG. 9b. Mounted on the carriage is a pneumatic cylinder 146 having an extendable driving arm 147 constructed of a fairly thick steel member. Thus, upon energization of a microswitch 148, the cylinder 146 is actuated causing an upward movement of the driving arm 147 into the path of the claws 142. The next claw 142 which passes by, in the path of the arm 147, will engage the arm 147 and cause the carriage 144 to shift to the right on the trackway 145. As this occurs, another microswitch 149 will become energized and actuate a pneumatic cylinder 150 which causes the extensible movement of a clamping arm 151. The clamping arm 151 will extend or shift into the pathway of the stock passing through the apparatus S' and includes a pair of shiftable fingers 152 which will come together and engage the moving stock. It is to be noted that the carriage 144 will shift to the right in its traversing movement at the same speed as the stock which is moving through the apparatus S'. A cutter or saw 153 which is energizable by a microswitch 154, will be shifted upwardly by the movement of a double acting pneumatic cylinder 155. The cutter or saw contains a cutting blade 156. After the blade 156 has cut the stock, the saw 153 will engage a limit microswitch 157 causing reactuation of the double acting pneumatic cylinder 155, and hence enable retraction of the saw 153 to its lowermost position. This action will also enable the driving arm 147 to become disengaged from the stock and shift to the left to its initial or retracted position.

It can be seen from the aforementioned sequence of events that the carriage will begin to move in timed relationship to the movement of the stock upon extension of the driving arm 147 which is engageable by a claw 142. As this occurs, the clamping arm will begin to move toward the stock so that the fingers 152 are in the path of the stock. The fingers will then shift toward each other to engage the stock for purposes of cutting. Thereafter, the cylinder 155 is actuated to shift the cutting blade 156 upwardly to sever the stock into two sections. After the cutting operation has been completed, the saw is retracted and the clamping arm 151 is retracted by actuation of the cylinder 150. Toward the end of the forward limit of travel, the driving arm 147 is retracted by actuation of the cylinder 146 and the cylinder 158 will shift the entire carriage 144 to the left, to its initial position. Furthermore, the stock is continually pulled through the apparatus S' by means of the claw 142. However, it should be observed that the portion of the stock preceding the severed strip has already been engaged at a stub $t$ by means of another claw. It is possible to program the apparatus S' in order to provide stock lengths of 10, 20, 30, etc. feet lengths. For this purpose, a control panel 160 with a suitable electrical control mechanism (not shown) is provided. The control mechanism constitutes state of the art available electronic circuitry and is, therefore, neither illustrated nor described in detail herein.

Also mounted on the supporting structure 104 immediately to the right of the cutting unit 137 is a conveyor unit 161 which includes a conveyor belt 162 trained around a pair of pulleys 163, the latter being mounted on a horizontally disposed support beam 164. By reference to FIGS. 8b and 9b, it can be seen that the conveyor unit 161 is mounted immediately beneath the stock driving unit 138. Toward the forward end of the stock conveyor unit 161 is a stock release mechanism 165 which comprises a pneumatic cylinder 166 having an upwardly extending rectangularly shaped bracket 167. By reference to FIG. 18, it can be seen that the stock continually passes through the aperture in the rectangularly shaped bracket 167. As the stub portion $t$ is moved into alignment with the bracket 167 by means of the claw 142, the pneumatic cylinder 166 is actuated for pulling the bracket 167 downwardly. In this manner, it is possible to remove any stock which may be unauthorizedly fixed to the fingers 143 on the claws 142. It is also possible to urge removal of the stock from the claws 142 by increasing the speed of the belt 162 with respect to the stock conveyor 138. Thus, for many types of stock, it is possible to eliminate the stock release mechanism 165.

The stock is then permitted to travel along the conveyor belt 162. It is to be noted that the various sections of stock are continually pulled past the cutting unit 137 by means of the sequentially spaced claws 142. In like manner, the stock is also moved along the conveyor belt 162. By further reference to FIG. 18, it can be seen that the cylinder 166 is pivoted in order to absorb the force of engagement with the moving claw 142. Furthermore, this pivoting movement causes actuation of a microswitch 168 which, in turn, energizes the pneumatic cylinder 166 to cause retraction of the bracket 167. The retraction of the bracket 167 is a momentary action and it is shifted back to its initial position after the stock has been released from the fingers 143 on the claw 142.

Also mounted on the base plate 1, immediately to the right of the stock conveyor section 161 is a driving unit 169. The driving unit 169, through suitable gear and pulley mechanism, is connected to the conveyor belt 162, the chain 141, and the belt 126 in the manner as illustrated in FIGS. 8b and 9b. The drive unit 169 also includes a tiltable conveyor platform 170 which contains a moving conveyor belt 171 for withdrawing the stock from the conveyor belt 162. As the stock is moved off of the end of the tiltable platform 170, it can then be conveniently dropped into a suitable container for collecting the same. It can be observed that the apparatus S' of the present invention is capable of providing "A" or "B" stage profile forms in selected lengths as may be desired, by merely controlling the actuation of the spot curing unit 126 and the cutting unit 137. For this purpose, additional sections of the stock conveyor unit can be inserted in the apparatus S' as desired.

In use, a profile form can be cured in any desired shape or form. For example, FIG. 19 provides a typical forming block set 85 which includes a pair of L-shaped guides 86 and a pair of rollers 87. It can be seen that by placing a section of the profile in the "A" or "B" stage, in a suitable forming element, the profile can be bent into a desired form. This particular form represents a portion of a chair frame. After the profile has been bent to this form it can then be heated or cured to the "c" stage or rigid stage. It should be recognized that any conventional shaping mechanism could be employed and that the profile could be bent to any desired form.

Any conventional curing mechanism can be used to obtain softening or melting and activation of the catalysis system in any thermosetting resin. Generally, the method of heating is chosen to provide correct energy for heating a particular material. It is possible to employ infrared heating or heated air or gas in many systems for curing the resin matrix. Ultraviolet curing and radio frequency heating is also very advantageous for curing the resin matrix in the profile of the present invention. The radio frequency generators used for the curing of the matrix generally operate in the VHF or UHF range. Such method of heating is more fully described in the W. B. Goldsworthy U.S. Pat. No. 2,871,911 and generally employs frequencies such as 13.5 megacycles, 27.1 megacycles, and 40.6 megacycles.

It should be understood that changes and modifications in the form, construction, arrangement, and combination of parts can be made and substituted for those herein shown without departing from the nature and principle of my invention.

Having thus described my invention, what I desire to claim and secure by letter patent is:

1. A method of continuously producing uncured filament reinforced flexible profile forms comprising the steps of:
  a. impregnating a plurality of filaments with a curable resin matrix;
  b. consolidating the impregnated filaments about a longitudinal axis and into a continuous profile form to create a composite while simultaneously removing excess resin;
  c. enveloping said profile form in a non-porous and flexible plastic film in a manner to provide for film margins having contiguous surfaces extending the length of said profile form;
  d. welding said film margins together along their contiguous surfaces to form a substantially airtight environment without curing said matrix;
  e. shrinking said film about said profile form primarily in a dimension being transverse to said longitudinal axis for tightly enclosing said composite and for providing the storage of said matrix in the A- or the B-stage.

2. The method of claim 1 further characterized in that air is removed from said composite before enveloping said profile form in said film.

3. The method of claim 1 further characterized in that the margins of said film are ultrasonically sealed.

4. The method of claim 1 further characterized in that the margins of said film are heat sealed.

5. The method of claim 1 further characterized in that the shrinking of the film is performed by passing the same into a heated zone.

6. The method of claim 1 further characterized in that air is forced rearwardly with respect to said profile form as said profile form is being enveloped in said film.

7. The method of claim 1 further characterized in that the profile form and film are passed into a zone of reduced pressure and enveloping is performed in the zone of reduced pressure.

8. The method of claim 7 further characterized in that the sealing of the margins of said film is performed in the reduced pressure zone.

9. The method of claim 1 further characterized in that said matrix remains in the A-stage after said film is shrunk.

10. The method of claim 1 further characterized in that said matrix is cured to the B-stage after said film is shrunk.

11. The method of claim 1 further characterized in that a suitable design formed on the inner surface of said film is transferred to the exterior of said profile form.

12. The method of claim 1 further characterized in that the shape and surface finish of said profile form is substantially imparted by said film.

13. The method of claim 1 further characterized in that a second film is wrapped about said flexible film.

14. A method of producing discrete lengths of filament reinforced profile forms comprising the steps of:
 a. impregnating a plurality of filaments with a curable matrix;
 b. consolidating said impregnated filaments into a linear profile form;
 c. wrapping said profile form in a non-porous flexible film in a manner to provide for film margins having contiguous surfaces extending along the length of said profile form;
 d. welding said film margins together along their contiguous surfaces to enclose said profile form without curing said resin matrix;
 e. shrinking said film about said profile form primarily in the direction being transverse to the length of said profile form to tightly enclose the same for retention of said resin in said A-stage;
 f. curing said resin matrix to make the same rigid at selected intervals along the length of said profile form; and
 g. severing said profile form at said cured intervals to form discrete lengths of film enclosed A-stage profile forms being sealed at their respective ends by said cured resin matrix.

15. The method of claim 14 further characterized in that the surface finish of the profile form is substantially imparted by said film.

16. The method of claim 14 further characterized in that a second film is wrapped about said flexible film.

17. The method of claim 14 further characterized in that the filaments are continuously drawn from a source.

18. The method of claim 17 wherein the impregnated filaments are consolidated around a given longitudinal axis.

19. The method of claim 18 wherein said profile form is deformed at said selected intervals immediately prior to the curing of the resin matrix residing in said selected intervals.

20. The method of claim 19 wherein means are provided for grasping said deformed and cured intervals of said profile form and for pulling said profile form through the method steps.

* * * * *